United States Patent
Markel

(10) Patent No.: US 10,207,237 B2
(45) Date of Patent: Feb. 19, 2019

(54) SYSTEMS AND METHODS FOR MEASURING PARTICLE ACCUMULATION ON REACTOR SURFACES

(71) Applicant: Univation Technologies, LLC, Houston, TX (US)

(72) Inventor: Eric J. Markel, Kingwood, TX (US)

(73) Assignee: Univation Technologies, LLC, Houston, TX (US)

(*) Notice: Subject to any disclaimer, the term of this patent is extended or adjusted under 35 U.S.C. 154(b) by 15 days.

(21) Appl. No.: 15/659,243

(22) Filed: Jul. 25, 2017

(65) Prior Publication Data

US 2017/0320034 A1  Nov. 9, 2017

Related U.S. Application Data

(62) Division of application No. 13/809,940, filed as application No. PCT/US2011/043329 on Jul. 8, 2011.

(Continued)

(51) Int. Cl.
*B01J 8/18* (2006.01)
*B01J 8/38* (2006.01)
(Continued)

(52) U.S. Cl.
CPC ............ *B01J 8/1809* (2013.01); *B01J 8/388* (2013.01); *C08F 2/00* (2013.01); *C08F 10/00* (2013.01); *B01J 2219/0018* (2013.01); *B01J 2219/00198* (2013.01); *B01J 2219/00213* (2013.01); *B01J 2219/00231* (2013.01); *B01J 2219/00247* (2013.01); *B01J 2219/00268* (2013.01); *B01J 2219/0245* (2013.01); *C08F 210/14* (2013.01); *C08F 210/16* (2013.01); *C08F 2400/02* (2013.01); *C08F 2500/24* (2013.01)

(58) Field of Classification Search
CPC . B01J 8/1809; B01J 8/388; C08F 2/00; C08F 10/00
See application file for complete search history.

(56) References Cited

U.S. PATENT DOCUMENTS

| 5,396,806 A | 3/1995 | Dechene et al. |
| 5,648,581 A | 7/1997 | Kubo et al. |

FOREIGN PATENT DOCUMENTS

WO    2008016478    7/2008

OTHER PUBLICATIONS

International Search Report & Written Opinion for related PCT Application PCT/US2011/043329, dated Oct. 31, 2011 (12 pgs).

(Continued)

*Primary Examiner* — Krishnan S Menon
*Assistant Examiner* — Dwan A Gerido
(74) *Attorney, Agent, or Firm* — Brooks, Cameron & Huebsch, PLLC

(57) ABSTRACT

Systems and methods for monitoring a particle/fluid mixture are provided. The method can include flowing a mixture comprising charged particles and a fluid past a particle accumulation probe. The method can also include measuring electrical signals detected by the probe as some charged particles pass the probe without contacting the probe while other charged particles contact the probe. The measured electrical signals can be manipulated to provide an output. The method can also include determining from the output if the charged particles contacting the probe have, on average, a different charge than the charged particles that pass the probe without contacting the probe.

14 Claims, 5 Drawing Sheets

Related U.S. Application Data

(60) Provisional application No. 61/364,966, filed on Jul. 16, 2010.

(51) Int. Cl.
 | | |
 |---|---|
 | *C08F 10/00* | (2006.01) |
 | *C08F 2/00* | (2006.01) |
 | *C08F 210/16* | (2006.01) |
 | *C08F 210/14* | (2006.01) |

(56) References Cited

OTHER PUBLICATIONS

Second Written Opinion for related PCT Application PCT/US2011/043329, dated Jul. 9, 2012 (5 pgs).
International Preliminary Report on Patentability for related PCT Application PCT/US2011/043329, dated Sep. 26, 2012 (13 pgs).
Marino, "Polyethylene Reaction Analyses: Before, During and After"; Progression Inc. (2004) (8 pgs).

SYSTEMS AND METHODS FOR MEASURING PARTICLE ACCUMULATION ON REACTOR SURFACES

This application is a Divisional Application of U.S. 371 National Stage application Ser. No. 13/809,940, filed Jan. 14, 2013 and published as U.S. Publication Number 2013-0115708 A1 on May 9, 2013, which claims priority to International Application Number PCT/US2011/043329, filed Jul. 8, 2011 and published as WO 2012/009216 on Jan. 19, 2012, which claims the benefit to U.S. Provisional Application 61/364,966, filed Jul. 16, 2010, the entire contents of which are incorporated herein by reference in its entirety.

BACKGROUND

In gas phase polymerization, a gaseous stream containing one or more monomers is passed through a fluidized bed under reactive conditions in the presence of a catalyst. A polymer product is withdrawn from the reactor, fresh monomer is introduced to the reactor to replace the removed polymer product, and any unreacted monomer is recycled back to the reactor. Process upsets in the reactor are often related to the accumulation or buildup of catalyst and/or polymer particles ("particle accumulation") on the walls and/or other surfaces, e.g., distribution plate, within the reactor. Particle accumulation is often referred to as sheeting, chunking, drooling, or plugging. When particle accumulation becomes sufficiently large, fluidization can be disrupted, which can require the reactor to be shut down.

Numerous techniques are used to measure the amount of particle accumulation and/or estimate the likelihood that particle accumulation may occur within the reactor. One approach involves measuring the static charge on the catalyst/polymer being produced within the reactor. The principal cause for static charge generation in the reactor is frictional contact of dissimilar materials by a physical process known as frictional electrification or the triboelectric effect. In gas phase polymerization reactors, the static is generated by frictional contact between the catalyst and polymer particles and the reactor walls. The observance of static charge, however, does not necessarily and frequently does not correspond to particle accumulation also occurring within the reactor and in particular catalyst particle accumulation. Conventional static charge measurement systems cannot distinguish between static charge present when particle accumulation is occurring and static charge present when particle accumulation is not occurring.

There is a need, therefore, for improved systems and methods for measuring particle accumulation of catalyst and/or polymer particles within a polymerization reactor.

SUMMARY

Systems and methods for monitoring a particle/fluid mixture are provided. The method can include flowing a mixture comprising charged particles and a fluid past a particle accumulation probe. The method can also include measuring electrical signals detected by the probe as some charged particles pass the probe without contacting the probe while other charged particles contact the probe. The measured electrical signals can be manipulated to provide an output. The method can also include determining from the output if the charged particles contacting the probe have, on average, a different charge than the charged particles that pass the probe without contacting the probe.

The system for monitoring a particle/fluid mixture can include a fluid conveying structure having a flow path for flowing a mixture comprising charged particles and a fluid through the fluid conveying structure. A particle accumulation probe can be in communication with the flow path and adapted to detect at least one electrical signal generated as the charged particles pass the probe without contacting the probe and as the charged particles contact the probe. An electrometer can be in communication with the particle accumulation probe and adapted to measure the electrical signal detected by the probe. A processor can be in communication with the electrometer. The processor can receive the measured electrical signal, manipulate the electrical signal, and provide an output indicating whether the charged particles contacting the probe are, on average, positively charged or negatively charged.

DETAILED DESCRIPTION

Figure 1:
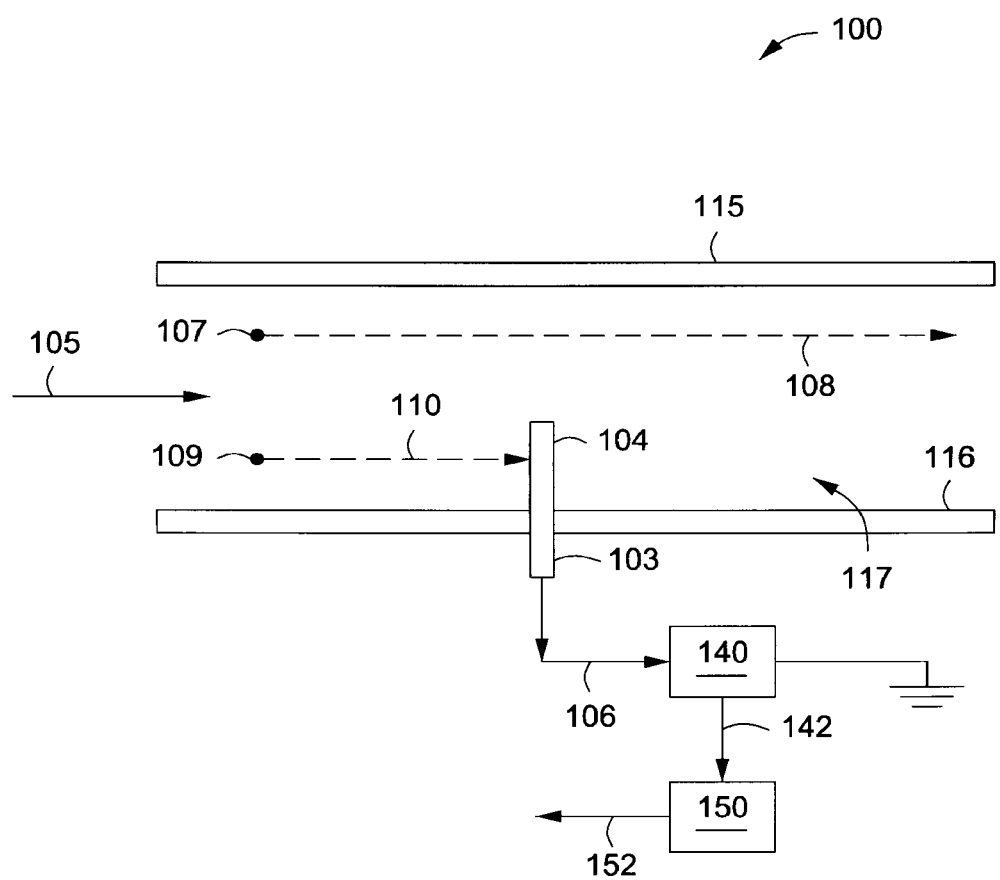
FIG. 1 depicts a schematic of an illustrative particle accumulation detection system configured to detect particles segregating out of a particle/fluid mixture.

FIG. 1 depicts a schematic of an illustrative particle accumulation detection system 100 configured to detect particles 107, 109 separating out of a particle/fluid mixture 105. The particle accumulation detection system 100 can include one or more particle accumulation probes or sensors (one is shown) 103, electrometers (one is shown) 140, and processors (one is shown) 150. The particle accumulation probe or "probe" 103 can be configured to detect one or more electrical signals or properties from charged particles (two are shown 107, 109) in a particle/fluid mixture 105. For example, a tip 104 of the probe 103 can be positioned or located within an internal volume 117 of a fluid conveying structure 115 such that the electrical signals or properties of the charged particles 107, 109 can be detected by the probe 103 as the particle/fluid mixture 105 flows through the fluid conveying structure 115. As shown in FIG. 1, two separate charged particles 107, 109 are depicted with each particle 107, 109 following a separate path 108, 110, respectively, through the fluid conveying structure 115. The particles 107, 109 can each be separate or discrete particles, as shown, and/or agglomerations or aggregations of multiple particles, not shown.

The probe 103 can detect the electrical signal of the particles 107, 109 as the charged particles 107, 109 approach and pass and/or approach and contact the probe 103. For example, in following path 108, the charged particle 107 passes the probe 103 without contacting with the probe 103. As the particle 107 approaches the probe 103 an approaching electrical signal or "leading lobe" can be detected via the probe tip 104. After the particle 107 passes and advances away from the probe 103 a leaving electrical signal or "lagging lobe" can be detected via the probe tip 104. The detected electrical signal via line 106 can be communicated to the electrometer 140 and then to ground. The electrometer 140 can measure or otherwise estimate the electrical signal detected via the probe 103 as the particle 107 passes the probe 103. In another example, in following path 110, the charged particle 109 comes into direct contact with the probe 103. The electrical signal of the particle 109 can be transferred to the probe 103. For example, the charged particle 109 can transfer its charge to the probe tip 104 and the transferred charge via line 106 can be communicated to the electrometer 140 and then to ground. The electrometer 140 can measure or otherwise estimate the charge transferred from the particle 109 to the probe 103. In other words, the probe 103 can detect the one or more electrical signals of the particles 107 that pass the probe 103 without contacting the probe 103 and the one or more electrical signals of the particles 109 that approach the probe 103 and contact the probe 103. As such, the electrometer can measure or otherwise estimate the electrical signals detected by the probe 103 as some charged particles 107 pass the probe without contacting the probe while other charged particles 109 contact the probe 103.

The charged particles 107, 109 can be positively charged or negatively charged. For example, the charged particle 107 can be positively charged and the charged particle 109 can be negatively charged. In another example, the charged particle 107 can be negatively charged and the charged particle 109 can be positively charged. In another example, the charged particles 107, 109 can both be positively charged or negatively charged.

It has been surprisingly and unexpectedly discovered that the one or more electrical signals or properties detected by the probe 103 can be used to determine whether or not the particles 107, 109 in the particle/fluid mixture 105 are, or are likely to be, segregating out of the particle/fluid mixture 105 and accumulating onto an inner surface 116 of the fluid conveying structure 115. It has also been surprisingly and unexpectedly discovered that the one or more electrical signals generated by particles 107 passing the probe 103, i.e. not contacting the probe 103, can be distinguished from electrical signals generated by the particles 109 contacting or striking the probe 103. Distinguishing between the particles 107 and 109, i.e. particles that pass the probe 103 and particles that strike or contact the probe 103, can provide an indication as to whether or not the particles in the particle/fluid mixture 105 are, or are likely to be, segregating out of the particle/fluid mixture and accumulating onto the inner surface 116 of the fluid conveying structure 115. For example, more particles 109 striking the probe 103 than particles 107 passing the probe 103 can indicate that the particles are, or are likely to be, segregating out of the fluid particle/fluid mixture 105 and accumulating onto the inner surface 116 of the fluid conveying structure 115. In another example, if the particles 109 striking the probe 103 have, on average, a different charge than the particles 107 approaching the probe 103, such determination can also indicate that the particles 109 are segregating out of the particle/fluid mixture 105 and accumulating onto the inner surface 116 of the fluid conveying structure 115.

The probe 103 can detect both positive electrical signals and negative electrical signals. For example the probe 103 can be capable of detecting both positive current and negative current. As such, in at least one example, the probe 103 can be referred to as a "bipolar" probe. A suitable and commercially available probe 103 can be the ElectroStatic Monitor Probe (model ESM3400) available from Progression, Inc.

The electrometer 140 can measure or estimate, for example, a current and/or voltage, detected via the probe 103. The measured current and/or voltage can also be referred to as "entrainment static," which is caused by the charged particles entrained or carried in the fluid. An electrometer 140 that detects a flow of current from the probe tip 104 to ground can include, but is not limited to, an ammeter, a picoammeter (a high sensitivity ammeter), or a multimeter. In another example, the electrometer 140 could also detect the current flow indirectly by measuring or estimating a voltage generated as the current flows through a resistor. As such, the probe 103 can include any probe, sensor, or other device capable of being monitored via the electrometer 140 to measure, estimate, or otherwise detect one or more electrical signals such as current and/or voltage.

The electrometer 140 can have a response time of about 0.05 seconds ("sec") or less, about 0.01 sec or less, about 0.009 sec or less, about 0.007 sec or less, or about 0.005 sec or less. For example, the electrometer 140 can have a response time ranging from about 0.0001 sec to about 0.01 sec, about 0.001 to about 0.008 sec, or about 0.003 sec to about 0.006 sec. The electrometer 140 can also include a 4 mA to about 20 mA transmitter. The transmitter can also be capable of operating at a response time of from about 0.0001 sec to about 0.01 sec.

The particle accumulation probe 103 and electrometer 140 can detect and measure the electrical signal(s) at any desired sampling rate or frequency. For example, the probe 103 and electrometer 140 can detect and measure the electrical signal(s) at a sampling frequency of about 90 Hz, about 100 Hz, about 125 Hz, about 150 Hz, or about 200 Hz or more than 200 Hz.

The electrical signal(s) detected via the probe 103 and measured via the electrometer 140 can be communicated as "raw" data via line 142 to the processor 150. The processor 150 can manipulate the detected electrical signal(s) or "raw" data received via in line 142 to provide an output or manipulated electrical signal via line 152. The output in line 152 can provide information as to one or more conditions of the particle/fluid mixture 105 within the fluid conveying structure 115. The output via line 152 can be introduced to a display such as a monitor, an alarm, an automated control system, or the like, or combinations thereof. The output via line 152 can indicate whether or not the particles 107, 109 are, or are likely to be, segregating out of the particle/fluid mixture 105 and accumulating onto the inner surface(s) 116 of the of the fluid conveying structure 115. For example, the output via line 152 can indicate the charge of the particular particles that, on average, contact or strike the probe 103.

Depending on the particular particle/fluid mixture 105, positively or negatively charged particles (on average) contacting or striking the probe 103 can indicate that particles are accumulating onto the inner surface(s) 116 of the fluid conveying structure 115.

The processor 150 can manipulate the electrical signal or "raw" data received via line 142 using any desired process or combination of processes. For example, the electrical signal in line 142 can undergo one or more mathematical operations to produce the output or manipulated electrical signal via line 152. In one example, the processor 150 can manipulate or process the electrical signal received via line 142 from the electrometer 140 using the absolute autocorrelation method. For example, the data communicated via line 142 from the electrometer 140 to the processor 150 can undergo a certain correlation process that correlates the mean centered data. Correlation of the mean centered electrical signal in line 142 can provide a signal-processing tool capable of extracting from the electrical signal in line 142 information that can indicate whether or not the particles 107, 109 in the particle/fluid mixture 105 are, or are likely to be, segregating out of the particle/fluid mixture 105 and accumulating onto the inner surfaces 116 of the fluid conveying structure 115. The output or output data provided via line 152 can be presented in a visually understandable form that can be used by operational personnel, automated control systems, or the like in controlling a system or process in which the particle/fluid mixture 105 is produced, used in, or the like.

The main or primary features of the absolute autocorrelation of a measured electrical signal, e.g., current, in line 142, and provided as the output via line 152, can include, but are not limited to, an approaching curve or "leading lobe," a leaving curve or "lagging lobe," and a zero-lag peak or peak at zero time lag. The leading and lagging lobes can be indicative of the charge on the particles 107, as the particles 107 approach the probe 103 and as the particles 107 pass and move away from the probe 103, respectively. The peak at zero time lag can be indicative of the charge on the particles 109 that strike or contact the probe 103. A charge on the particles 109, on average, that strike or contact the probe 103 that is different than the charge on the particles 107 that approach the probe 103 can indicate that the particles 109 are segregating out of the particle/fluid mixture 105.

The correlation calculations can be performed using the function "xcorr" in the commercially available Matlab software (available from The MathWorks). Alternatively, the correlation calculations can be performed on a computer or other processing system (e.g., processor 150) programmed in another appropriate manner. To calculate the correlation of vectors x and y (of equal size, n) using the Matlab software, the command "output=xcorr(x,y)" can be executed in the Matlab environment. Autocorrelation of vector x with itself is performed as a special case, using the command "output=xcorr(x)." Other suitable software that can be used to perform the absolute autocorrelation calculations can include, but are not limited to, Labview, Mathematica, and MathCad. We have found a correlation method especially useful for the analysis of data which involves (i) mean centering the data vector x (by subtracting the mean of the vector from each value), (ii) computing the vector y (comprising the absolute values of each datum in vector x), and (iii) calculating the output vector z (using the correlation function z=xcorr(x,y)). This general procedure, for the present purposes, will be referred to as "absolute autocorrelation." The vector z (the absolute autocorrelation vector) has 2n−1 terms, with the nth term comprising the absolute autocorrelated value corresponding to zero time lag. Covariance is a well known parameter related to autocorrelation and cross-correlation. Covariance values rather than cross correlated values can be determined in some embodiments of the invention. Similarly, the Matlab function "detrend" is closely related to the mean centering procedure describe above and can be used in some embodiments of the invention.

The absolute autocorrelated data or output in line 152 can indicate if the average charge of the particles 107, 109 in the particle/fluid mixture 105 contacting the probe 103 is negative or positive. Depending on the particular particle/fluid mixture 105, fluid conveying structure 115, conditions, e.g. temperature and pressure, and other factors, a positive charge, on average, contacting the probe 103 can indicate that the particles 107 and/or 109 are (or are likely to be) accumulating onto the inner surfaces 116 of the fluid conveying structure 115. Similarly, depending on the particular conditions, e.g., the particular particle/fluid mixture 105, a negative charge could indicate that the particles 107 and/or 109 are (or are likely to be) accumulating onto the inner surfaces 116 of the fluid conveying structure 115.

The particle accumulation detection system 100 can be used to monitor any process or system that includes, produces, uses, potentially could include, potentially could produce, potentially could use, or otherwise contains or could contain a charged particle/fluid mixture 105. Illustrative systems can include, but are not limited to, slurry based polymerization systems, solution based polymerization systems, gas phase polymerization systems, coal gasification, catalytic reforming, catalytic cracking, cement processing, ash or carbon processing operations, and the like.

Accordingly, the particles 107, 109 in the particle/fluid mixture 105 can include polymer particles, catalyst particles, coal, ash, zeolites, and the like. The fluid can be in the gaseous phase, liquid phase, or a combination thereof. Illustrative fluids can include, but are not limited to, hydrocarbons, e.g., alkanes and alkenes, liquid water, steam, nitrogen, carbon dioxide, carbon monoxide, hydrogen, oxygen, air, or any combination thereof.

The particle/fluid mixture 105 can also include a combination of two or more different particles, e.g., a polymerization system or process could include a particle/fluid mixture containing both polymer particles and catalyst particles.

An exemplary process in which the particle accumulation detection system can be used to monitor electrical signals generated from charged particles in the particle/fluid mixture can be a gas phase polymerization system. The gas phase polymerization system can use one or more metallocene catalysts, for example, to polymerize one or more olefins. From the measured electrical signals or data the relative amounts of entrained solid particles (i.e. catalyst particles and polymer particles) that pass the probe as well as strike the probe (as well as their average charges) can be extracted from the measured electrical signals. For example, a current can be measured via the electrometer and the processor can provide an output that shows the absolute autocorrelation of the current.

The particles/fluid mixture 105 flowing past the probe 103 can be at a high speed, e.g. about 15 m/s, and as such, the passing and striking events can occur in a short period of time, e.g. less than 1 second. Additionally, there can be a substantial number of particles 107, 109 interacting with the probe 103. The absolute autocorrelation methods can provide a useful means to extract an average description of these multiple, fast interactions between the moving charged particles 107, 109 and the probe 103. Because the interactions occur on such a short time scale, the interactions are observed in the absolute autocorrelation of data in the region corresponding to a fraction of a second lead/lag time.

As mentioned above, the primary features of the absolute autocorrelation of the measured current in line 142 and provided as the output via line 152 can include a leading lobe, a lagging lobe, and a zero-lag peak or peak at zero time lag. For a typical gas phase polymerization system, the leading lobe can be located at about −0.11 seconds and the lagging lobe can usually be a mirror image of the leading lobe and will usually be at about +0.11 seconds. For gas phase polymerization using metallocene catalyst, it has been found that the leading lobe is nearly always a minimum-type peak and the lagging lobe is nearly always a positive-type peak. This observation corresponds with typical entrainment static probe measurements that indicate entrained polymer product usually has a negative charge. As such, the "negative" or minimum-type leading lobe usually indicates negatively charged polymer particles approaching the probe and the lagging lobe usually indicates the negatively charged polymer particulates leaving or passing away from the probe. Accordingly, in most data reviewed for gas phase polymerization using metallocene catalyst, the leading and lagging lobes are minima and maxima, respectively, indicating the charged particles in the cycle gas are dominated by negatively charged polymer particles.

The peak at zero time lag describes the particles that strike the probe. Under normal or typical operations, the peaks at zero time lag are minima (just like the leading lobe). Without wishing to be bound by theory, it is believed that this observation is due to the fact that, under typical observations, the average particle striking the probe is of the same charge sign as the average particles approaching the probe. In the context of gas phase polymerization using metallocene catalyst, a surprising and unexpected finding is the very unusual event where the leading lobe and zero time lag peak are different. For example, the leading lobe is a minimum while the zero time lag peak is a maximum. This unusual event occurs when the particles striking the probe are different (on average) than the particles approaching the probe. As used herein, the term "segregation," refers to the event in which the particles striking the probe are different, on average, than the particles approaching the probe.

The ability to detect segregation is important for gas phase polymerization processes and other processes that include or can potentially include charged particles. In gas phase polymerization, in particular, segregation is a known precursor to reactor shut down. In other words, segregation of the charged metallocene catalyst (nearly always positively charged) from the charged polymer particles (nearly always negatively charged) causes agglomeration and/or fouling within the reactor, which leads to reactor shut down.

As the metallocene catalyst segregates from the average flow of the particle/fluid mixture and accumulates on the probe (or any other inner surfaces such as the reactor wall and/or the inner walls of the cycle line), the concentrated deposit of active catalyst particles overheats as polymerization reactions proceed and the polymer generated melts to form agglomerates. These hot-spots of melted polymer can increase in size by a factor of hundreds, thousands, or even tens of thousands, forming oversized agglomerations that can plug the piping, the reactor, and/or associated equipment, requiring shut down. Accordingly, determination of when catalyst particles being to segregate out of the particle/fluid mixture provides an early warning or indicator that agglomeration and/or fouling is occurring or about to occur within the gas phase polymerization system and corrective measures can be taken in order to reduce the likelihood or prevent the agglomerations from forming.

The size of the particles 107, 109 can vary between different systems or processes and/or during operation of any particular system or process. For example, the particles 107, 109, depending on the particular process or system, can have a diameter or cross-sectional length ranging from a low of about 0.01 µm, about 0.1 µm, about 1 µm, or about 10 µm to a high of about 0.1 mm, about 1 mm, or about 5 mm. In another example, a particular process or system can have a particle/fluid mixture 105 that includes two or more different particles and those two or more different particles can have the same average diameter or cross-sectional length or different average diameter or cross-sectional length. In a specific example, in a particle/fluid mixture 105 of a polymerization system that includes both polymer particles and catalyst particles, the polymer particles can have an average diameter or cross-sectional length ranging from a low of about 0.1 mm, about 0.5 mm, or about 1 mm to a high of about 2 mm, about 2.5 mm, or about 3 mm and the catalyst particles can have an average diameter or cross-section length ranging from a low of about 5 µm, about 10 µm, or about 20 µm to a high of about 80 µm, about 100 µm, or about 125 µm.

The particle/fluid mixture 105 can have a particle concentration ranging from about 0.001 percent by weight (wt %) to about 5 wt %, or from about 0.01 wt % to about 1 wt %, or from about 0.05 wt % to about 0.5 wt %, based on the total weight of the particle/fluid mixture. For example, the particle concentration in the particle/fluid mixture 105 can range from a low of about 0.01 wt %, about 0.05 wt %, about 0.07 wt %, or about 0.1 wt % to a high of about 0.2 wt %, about 0.3 wt %, about 0.4 wt %, or about 0.5 wt %, based on the total weight of the particulate/fluid mixture.

The velocity of the particle/fluid mixture 105 flowing through the fluid conveying structure 115 can vary depending on the particular process or system. Illustrative particle/fluid mixture 105 velocities or average flow rates through the fluid conveying structure 115 can range from a low of about 1 m/s, about 5 m/s, about 10 m/s or about 15 m/s to a high of about 20 m/s, about 30 m/s, about 40 m/s, or about 50 m/s. For example, a gas phase polymerization system can have a particle/fluid mixture flowing from a top of a polymerization reactor, through a cycle or recycle line, and to the bottom of the polymerization reactor, with a velocity typically ranging from about 5 m/s to about 30 m/s, or from about 10 m/s to about 20 m/s, or from about 12 m/s to about 18 m/s.

Depending on the particular system or process, the particle/fluid mixture 105 can be monitored via the particle accumulation detection system 100 within a number of different types of fluid conveying structures. Illustrative fluid conveying structures 115 can include, but are not limited to, pipes, tubes, hoses, reactors, e.g., polymerization reactors, fluidized catalytic reactors, and the like, ducts, conduits, exhaust or vent stacks, transfer or transportation pipes or pipelines, and the like. For example, the fluid conveying structure 115 can be a gas phase polymerization reactor and/or one or more process lines associated with the gas phase polymerization reactor, such as a cycle fluid line, a product recovery line, and/or a vent line.

Figure 2:
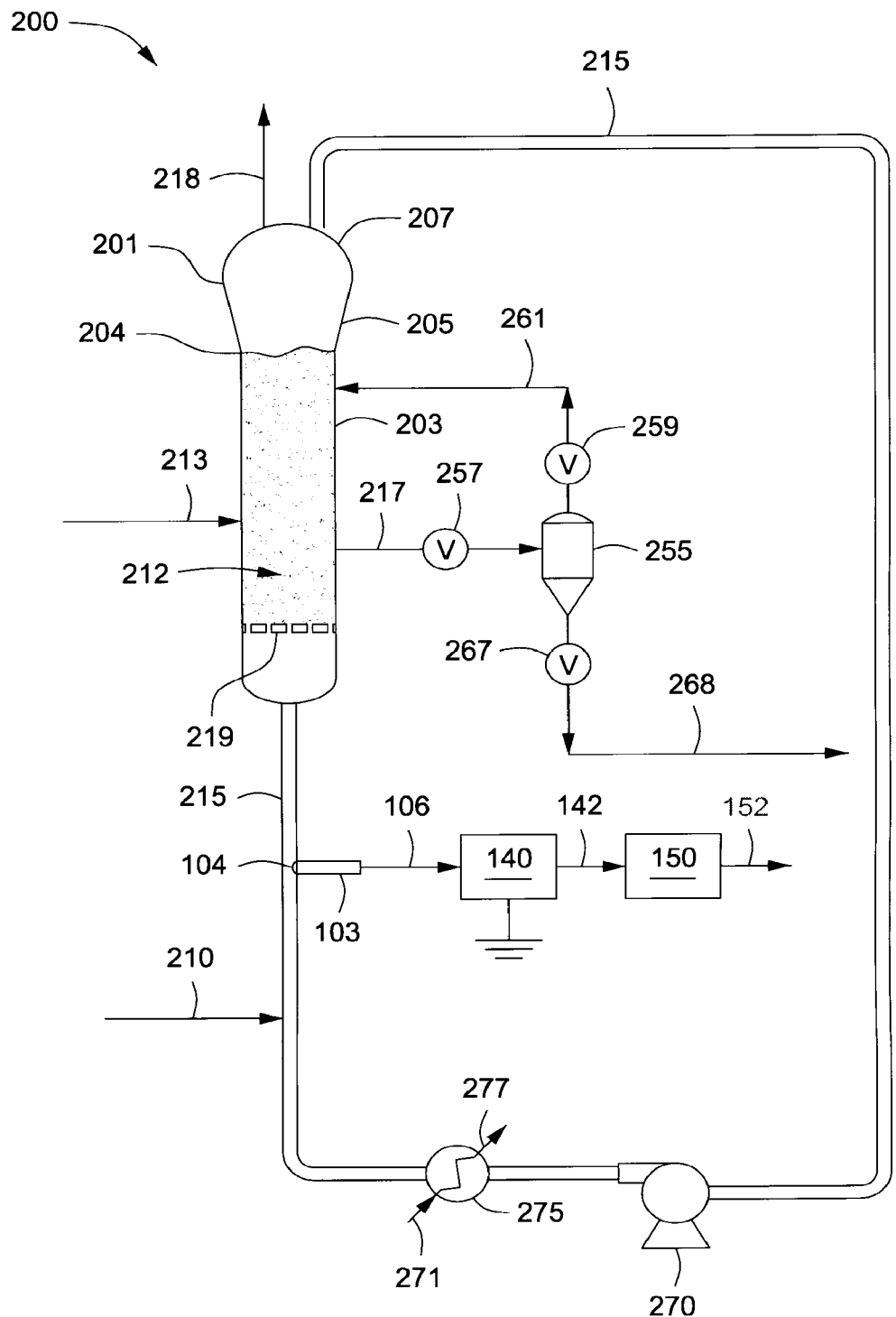
FIG. 2 depicts a schematic of an illustrative gas phase polymerization system having a particle accumulation probe configured to detect catalyst accumulation on the inner surfaces of the polymerization system.

FIG. 2 depicts a schematic of an illustrative gas phase polymerization system 200 having a particle accumulation probe 103 configured to detect catalyst accumulation on the inner surfaces of the polymerization system 200. The polymerization system 200 can include one or more polymerization reactors 201, discharge tanks 255 (only one shown), recycle compressors 270 (only one shown), and heat exchangers 275 (only one shown). The polymerization system 200 can include more than one reactor 201 arranged in series, parallel, or configured independent from the other reactors, each reactor having its own associated discharge tanks 255, recycle compressors 270, and heat exchangers 275 or alternatively, sharing any one or more of the associated discharge tanks 255, recycle compressors 270, and heat exchangers 275. For simplicity and ease of description, embodiments of the invention will be further described in the context of a single reactor train.

The reactor 201 can include a cylindrical section 203, a transition section 205, and a velocity reduction zone or dome 207. The cylindrical section 203 is disposed adjacent the transition section 205. The transition section 205 can expand from a first diameter that corresponds to the diameter of the cylindrical section 203 to a larger diameter adjacent the dome 207. The location or junction at which the cylindrical section 203 connects to the transition section 205 can be referred to as the "neck" or the "reactor neck" 204.

The cylindrical section 203 can include a reaction zone 212. The reaction zone can be a fluidized reaction bed or fluidized bed. In one or more embodiments, a distributor plate 219 can be disposed within the cylindrical section 203, generally at or toward the end of the cylindrical section that is opposite the end adjacent to the transition section 205. The reaction zone 212 can include a bed of growing polymer particles, formed polymer particles and catalyst particles fluidized by the continuous flow of polymerizable and modifying gaseous components in the form of make-up feed and recycle fluid through the reaction zone 212.

One or more cycle fluid lines 215 and vent lines 218 can be in fluid communication with the top head 207 of the reactor 201. A polymer product can be recovered via line 217 from the reactor 201. A reactor feed via line 210 can be introduced to the polymerization system 200 at any location or combination of locations. For example, the reactor feed via line 210 can be introduced to the cylindrical section 203, the transition section 205, the velocity reduction zone 207, to any point within the cycle fluid line 215, or any combination thereof. Preferably, the reactor feed 210 is introduced to the cycle fluid in line 215 before or after the heat exchanger 275. A catalyst feed via line 213 can be introduced to the polymerization system 200 at any point. Preferably the catalyst feed via line 213 is introduced to a fluidized bed 212 within the cylindrical section 203.

The particle accumulation probe 103 can be in communication with the polymerization system 200 at any number of locations. As shown in FIG. 2, a probe 103 is in communication with the cycle line 215 between the reactor 201 and the heat exchanger 275. Other suitable locations the probe 103 can be in communication with the polymerization system 200 can include, but are not limited to, the cylindrical section 203, transition section 205, and dome 207. For example, the probe 103 can be in communication with the cylindrical section 203 between an inlet of the cycle line 215 to the reactor 201 and the distributor plate 219 or between the distributor plate 219 and the transition section 205. In another example, the probe 103 can be in communication with the cycle line 215 between the heat exchanger 275 and the compressor 270. The probe 103 can also be in communication with the cycle line 215 between the dome 207 of the reactor 201 and the compressor 270.

Any number of probes 103 can be in communication with the polymerization system 200. For example, 1, 2, 3, 4, 5, 6, 7, 8, 9, 10, or more probes 103 can be in communication with the polymerization system 200. If two or more probes 103 are in communication with the polymerization system 200, the two or more probes 103 can be disposed about different locations, the same or similar locations, or a combination of different and similar locations.

If two or more probes 103 are in communication with the polymerization system 200, the two or more probes 103 can communicate the detected electrical signal(s) via line 106 to a single electrometer 140. In another example, if two or more probes 103 are in communication with the polymerization system 200, the two or more probes 103 can communicate the detected electrical signal(s) via line 106 to separate or independent electrometers 140. In still another example, multiple probes 103 can communicate the detected electrical signal(s) via line 106 to a single electrometer 140 and one or more other probes 103 can communicate the detected electrical signal(s) via line 106 to separate electrometers 140. Similarly, any number of processors 150 can be used to manipulate the data provided via line 142 from one or more electrometers 140.

The particle accumulation probe 103 can be used during predetermined or selected polymerization process periods, continuously, randomly, or any combination thereof. For example, the particle accumulation probe 103 can be used to detect one or more electrical signals generated by the passing and/or contacting particles 107, 109 during polymerization reactor start-up. Polymerization reactor start-up can be a particularly sensitive process time period because catalyst-rich accumulations onto the inner surfaces of the polymerization system 200, e.g., reactor 201, cycle line 215, and the like, are more likely to occur. When catalyst particles accumulate onto the inner surfaces of the polymerization system 200 hot spots form and can cause polymer particles to melt and fuse. The melted and/or fused polymer particles are the precursor to sheeting, chunking, drooling, plugging, and the like. The agglomerations can occur on the inner surfaces of the cylindrical section 203, transition section 205, dome 207, cycle line 215, below the distributor plate 219, within the heat exchanger 271, and the like. The occurrence of such agglomerations or fouling can be especially prone when using metallocene catalyst because much higher levels of static are generated in contrast to other polymerization catalysts such as Ziegler-Natta catalysts. Other polymerization process time periods that can be more prone to agglomeration or fouling can include transition periods, i.e. when transition between one polymer product to another polymer product is made, super-condensed mode operation, entering condensed mode operation, operation at low condensing levels, loss of fluidized bed level control, and the like.

Accordingly, the particle accumulation probe 103 can be selectively operated during predetermined process time periods, such as polymerization reactor start-up. In another example, the particle accumulation probe 103 can be continuously or substantially continuously operated during operation of the polymerization system 200.

One particularly desirable polymerization process time period that the probe 103 can be used to detect the electrical signal(s) of the passing and/or contacting particles 107, 109 is polymerization reactor start-up. Fouling of the distributor plate 219 during polymerization reactor start-up is commonly referred to as "hyperfouling." Hyperfouling starts with catalyst particles (or catalyst-rich particles) segregating out of the cycle gas and accumulating onto the inner surfaces of the reactor 201, cycle line 215, and the like. Entrainment static is virtually always observed during polymerization start-up. However, not all entrainment static results in hyperfouling.

For example, entrainment static generated by the particles in the cycle fluid flowing through the cycle line 215 and detected via the probe 103 can be large, e.g., +/−200 nano-amps (nA, instantaneous) or even +/−400 nA, instantaneous, but no hyperfouling occurs. At other times, the current or entrainment static generated by the particles in the cycle fluid flowing through the cycle line 215 and detected via the probe 103 can be large and hyperfouling does occur. Probability dictates that the charged particles, i.e. polymer particles and catalyst particles, will both strike or contact the probe 103 as the charged particles flow toward the probe. Without wishing to be bound by theory, it is believed that when number of charged particles contacting the probe 103, on average, are catalyst particles, conditions within the polymerization system 200 are such that catalyst segregation from the particle/fluid mixture 105 is occurring or is likely to occur. Similarly, it is believed that when the number of charged particles contacting the probe 103, on average, are polymer particles, conditions within the polymerization system 200 are such that the catalyst particles are not segregating out of the particle/fluid mixture 105, at least not in a sufficient amount to cause catalyst accumulation that tends to or is likely to lead to hyperfouling and other polymer agglomerations within the polymerization system 200.

Accordingly, and without wishing to be bound by theory, it is believed that process conditions should be adjusted when the average number of charged particles striking the probe 103 are catalyst particles in order to prevent hyperfouling during polymerization startup. Additionally, from experiment and observation it has been found that for polymerization with metallocene catalyst, the catalyst particles are positively charged and the polymer particles are negatively charged. As such, observation of an average number of positively charged particles contacting the probe 103 from the absolute autocorrelated data can be interpreted to indicate that the catalyst particles are segregating out of the cycle fluid and accumulating onto the inner surfaces of the polymerization system. In other systems, however, observation of an average number of negatively charged particles contacting the probe 103, as indicated by the absolute autocorrelated data, can indicate that the catalyst particles are segregating out of the cycle fluid and accumulating onto the inner surfaces of the polymerization system. As such, depending on the particular polymerization reaction conditions the particular observation, i.e. average number of particle strikes are positive or negative, could indicate catalyst particle accumulation onto the inner surfaces of the polymerization system 200.

If an undesired amount or degree of catalyst particles are estimated to be accumulating or likely to begin accumulating onto the inner surfaces of the polymerization system 200, e.g., the inner surfaces of the reactor 201, cycle line 215, and the like, one or more operational adjustments or steps can be taken to reduce the accumulation of or tendency for the particles to accumulate. For example, one or more continuity additives and/or antistatic agents can be introduced to the reactor 201 to reduce the level of static charge on the polymer product therein. In another example, a rate of catalyst and/or feed introduction can be adjusted or modified, e.g., increased or decreased. In still another example, the reactor 201 can be idled for a period of time, i.e. polymerization can be stopped within the reactor 201, but fluids can continue to cycle therein and a non-reacting fluidized bed can be maintained within the reactor during idling. Illustrative idling techniques can include those discussed and described in U.S. Provisional Patent Application having Ser. No. 60/305,623. In yet another example, the reactor 201 can be shut down or "killed." Other actions or adjustments that can be taken to reduce the amount of charge on the polymer product within the reactor 201 can also include, but are not limited to, replacing a source of the catalyst introduced via line 213 to the reactor 201 with a different source of the catalyst, changing the type of catalyst introduced via line 213 to the reactor 201, adjusting a concentration of any condensing agents, if used, within the reactor 201, transitioning the polymerization reactor 201 to produce a different polymer product, and the like. Any one or more operational adjustments or steps can be taken alone, in any combination, and/or in any order to reduce the amount of charge on the polymer product within the reactor 201.

Other illustrative techniques that can also be used to reduce or eliminate catalyst particle accumulation on the inner surfaces of the polymerization system 200 can include the introduction of finely divided particulate matter to prevent agglomeration, as described in U.S. Pat. Nos. 4,994,534 and 5,200,477. Condensing mode operation, such as disclosed in U.S. Pat. Nos. 4,543,399 and 4,588,790 can also be used to assist in heat removal from the fluid bed polymerization reactor.

Introducing continuity additive(s) can include the addition of negative charge generating chemicals to balance positive voltages or the addition of positive charge generating chemicals to neutralize negative voltage potentials as described in U.S. Pat. No. 4,803,251. Antistatic substances can also be added, either continuously or intermittently to prevent or neutralize electrostatic charge generation. The continuity additive and/or antistatic substances, if used, can be introduced with the feed via line 210, the catalyst via line 213, a separate inlet (not shown), or any combination thereof.

The continuity additive can interact with the particles and other components in the fluidized bed. For example, the continuity additive can reduce or neutralize static charges related to frictional interaction of the catalyst and polymer particles. The continuity additive can also react or complex with various charge-containing compounds that can be present or formed in the reactor. The continuity additive can also react or complex with oxygenates and other catalyst poisons. The continuity additive can also be referred to as a static control agent.

As used herein, the term "continuity additive" refers to a compound or composition that when introduced into a gas phase fluidized bed reactor can influence or drive the static charge (negatively, positively, or to zero) in the fluidized bed. The continuity additive or combination of continuity additives can depend, at least in part, on the nature of the static charge. The particular continuity additive or combination of continuity additives can depend, at least in part, on the particular polymer being produced within the polymerization reactor, the particular spray dried catalyst system or combination of catalyst systems being used, or a combination thereof. Suitable continuity additives and uses thereof can be as discussed and described in European Patent No. 0 229 368; U.S. Pat. Nos. 5,283,278; 4,803,251; and 4,555, 370; and WO Publication No. WO2009/023111; and WO01/44322.

Continuing with reference to FIG. 2, in general, the height to diameter ratio of the cylindrical section 203 can vary in the range of from about 2:1 to about 5:1. The range, of course, can vary to larger or smaller ratios and depends, at least in part, upon the desired production capacity and/or reactor dimensions. The cross-sectional area of the dome 207 is typically within the range of from about 2 to about 3 multiplied by the cross-sectional area of the cylindrical section 203.

The velocity reduction zone or dome 207 has a larger inner diameter than the cylindrical section 203. As the name suggests, the velocity reduction zone 207 slows the velocity of the gas due to the increased cross-sectional area. This reduction in gas velocity allows particles entrained in the upward moving gas to fall back into the bed, allowing primarily only gas to exit overhead of the reactor 201 through the cycle fluid line 215. The cycle fluid recovered via line 215 can contain less than about 10% wt, less than about 8% wt, less than about 5% wt, less than about 4% wt, less than about 3% wt, less than about 2% wt, less than about 1% wt, less than about 0.5% wt, or less than about 0.2% wt of the particles entrained in fluidized bed 212. In another example, the cycle fluid recovered via line 215 can have a particle concentration ranging from a low of about 0.001 wt % to about 5 wt %, from about 0.01 wt % to about 1 wt %, or from about 0.05 wt % to about 0.5 wt %, based on the total weight of the particle/cycle fluid mixture in line 215. For example, the particle concentration in the cycle fluid in line 215 can range from a low of about 0.01 wt %, about 0.05 wt %, about 0.07 wt %, or about 0.1 wt % to a high of about 0.5 wt %, about 1.5 wt %, about 3 wt %, or about 4 wt %, based on the total weight of the cycle fluid and particles in line 215.

Suitable gas phase polymerization processes for producing the polymer product via line 217 are described in U.S. Pat. Nos. 3,709,853; 4,003,712; 4,011,382; 4,302,566; 4,543,399; 4,588,790; 4,882,400; 5,028,670; 5,352,749; 5,405,922; 5,541,270; 5,627,242; 5,665,818; 5,677,375; 6,255,426; European Patent Nos. EP 0802202; EP 0794200; EP 0649992; EP 0634421. Other suitable polymerization processes that can be used to produce the polymer product can include, but are not limited to, solution, slurry, and high pressure polymerization processes. Examples of solution or slurry polymerization processes are described in U.S. Pat. Nos. 4,271,060; 4,613,484; 5,001,205; 5,236,998; and 5,589,555.

The reactor feed in line 210 can include any polymerizable hydrocarbon of combination of hydrocarbons. For example, the reactor feed can be any olefin monomer including substituted and unsubstituted alkenes having two to 12 carbon atoms, such as ethylene, propylene, 1-butene, 1-pentene, 1-hexene, 1-heptene, 1-octene, 4-methylpent-1-ene, 1-decene, 1-dodecene, 1-hexadecene, and the like. The reactor feed can also include non-hydrocarbon gas(es) such as nitrogen and/or hydrogen. The reactor feed can enter the reactor at multiple and different locations. For example, monomers can be introduced into the fluidized bed in various ways including direct injection through a nozzle (not shown) into the fluidized bed. The polymer product can thus be a homopolymer or a copolymer, including a terpolymer, having one or more other monomeric units. For example, a polyethylene product could include at least one or more other olefin(s) and/or comonomer(s).

The reactor feed in line 210 can also include the one or more modifying components such as one or more induced condensing agents ("ICAs"). Illustrative ICAs include, but are not limited to, propane, butane, isobutane, pentane, isopentane, hexane, isomers thereof, derivatives thereof, and combinations thereof. The ICAs can be introduced to provide a reactor feed to the reactor having an ICA concentration ranging from a low of about 1 mol %, about 5 mol %, or about 10 mol % to a high of about 25 mol %, about 35 mol %, or about 45 mol %. Typical concentrations of the ICAs can range from about 14 mol %, about 16 mol %, or about 18 mol % to a high of about 20 mol %, about 22 mol %, or about 24 mol %. The reactor feed can include other non-reactive gases such as nitrogen and/or argon. Further details regarding ICAs can be as discussed and described in U.S. Pat. Nos. 5,352,749; 5,405,922; 5,436,304; and 7,122,607; and WO Publication No. 2005/113615(A2).

The catalyst feed in line 213 can include any catalyst or combination of catalysts. Illustrative catalysts can include, but are not limited to, Ziegler-Natta catalysts, chromium-based catalysts, metallocene catalysts and other single-site catalysts including Group 15-containing catalysts, bimetallic catalysts, and mixed catalysts. The catalyst can also include $AlCl_3$, cobalt, iron, palladium, chromium/chromium oxide or "Phillips" catalysts. Any catalyst can be used alone or in combination with any other catalyst.

Suitable metallocene catalyst compounds can include, but are not limited to, metallocenes described in U.S. Pat. Nos. 7,179,876; 7,169,864; 7,157,531; 7,129,302; 6,995,109; 6,958,306; 6,884748; 6,689,847; 5,026,798; 5,703,187; 5,747,406; 6,069,213; 7,244,795; 7,579,415; U.S. Patent Application Publication No. 2007/0055028; and WO Publications WO 97/22635; WO 00/699/22; WO 01/30860; WO 01/30861; WO 02/46246; WO 02/50088; WO 04/022230; WO 04/026921; and WO 06/019494.

The "Group 15-containing catalyst" may include Group 3 to Group 12 metal complexes, wherein the metal is 2 to 8 coordinate, the coordinating moiety or moieties including at least two Group 15 atoms, and up to four Group 15 atoms. For example, the Group 15-containing catalyst component can be a complex of a Group 4 metal and from one to four ligands such that the Group 4 metal is at least 2 coordinate, the coordinating moiety or moieties including at least two nitrogens. Representative Group 15-containing compounds are disclosed in WO Publication No. WO 99/01460; European Publication Nos. EP0893454A1; EP 0894005A1; U.S. Pat. Nos. 5,318,935; 5,889,128; 6,333,389; and 6,271,325.

Illustrative Ziegler-Natta catalyst compounds are disclosed in European Patent Nos. EP 0103120; EP 1102503; EP 0231102; EP 0703246; U.S. Pat. Nos. RE 33,683; 4,115,639; 4,077,904; 4,302,565; 4,302,566; 4,482,687; 4,564,605; 4,721,763; 4,879,359; 4,960,741; 5,518,973; 5,525,678; 5,288,933; 5,290,745; 5,093,415; and 6,562,905; and U.S. Patent Application Publication No. 2008/0194780. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Suitable chromium catalysts can include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethylhexanoate, chromium acetylacetonate ($Cr(AcAc)_3$), and the like. Other non-limiting examples of chromium catalysts are described in U.S. Pat. No. 6,989,344.

The mixed catalyst can be a bimetallic catalyst composition or a multi-catalyst composition. As used herein, the terms "bimetallic catalyst composition" and "bimetallic catalyst" include any composition, mixture, or system that includes two or more different catalyst components, each having a different metal group. The terms "multi-catalyst composition" and "multi-catalyst" include any composition, mixture, or system that includes two or more different catalyst components regardless of the metals. Therefore, the terms "bimetallic catalyst composition," "bimetallic catalyst," "multi-catalyst composition," and "multi-catalyst" will be collectively referred to herein as a "mixed catalyst" unless specifically noted otherwise. In one example, the mixed catalyst includes at least one metallocene catalyst component and at least one non-metallocene component.

In some embodiments, an activator may be used with the catalyst compound. As used herein, the term "activator" refers to any compound or combination of compounds, supported or unsupported, which can activate a catalyst compound or component, such as by creating a cationic species of the catalyst component. Illustrative activators include, but are not limited to, aluminoxane (e.g., methylaluminoxane "MAO"), modified aluminoxane (e.g., modified methylaluminoxane "MMAO" and/or tetraisobutyldialuminoxane "TIBAO"), and alkylaluminum compounds, ionizing activators (neutral or ionic) such as tri (n-butyl) ammonium tetrakis(pentafluorophenyl)boron may be also be used, and combinations thereof.

The catalyst compositions can include a support material or carrier. As used herein, the terms "support" and "carrier" are used interchangeably and are any support material, including a porous support material, for example, talc, inorganic oxides, and inorganic chlorides. The catalyst component(s) and/or activator(s) can be deposited on, contacted with, vaporized with, bonded to, or incorporated within, adsorbed or absorbed in, or on, one or more supports or carriers. Other support materials can include resinous support materials such as polystyrene, functionalized or cross-linked organic supports, such as polystyrene divinyl benzene polyolefins or polymeric compounds, zeolites, clays, or any other organic or inorganic support material and the like, or mixtures thereof.

Suitable catalyst supports are described in U.S. Pat. Nos. 4,701,432; 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,665,665; 5,698,487; 5,714,424; 5,723,400; 5,723,402; 5,731,261; 5,759,940; 5,767,032; 5,770,664; and 5,972,510; and WO Publication Nos. WO 95/32995; WO 95/14044; WO 96/06187; WO 97/02297; WO 99/47598; WO 99/48605; and WO 99/50311.

The cycle fluid via line 215 can be compressed in the compressor 270 and then passed through the heat exchanger 275 where heat can be exchanged between the cycle fluid and a heat transfer medium. For example, during normal operating conditions a cool or cold heat transfer medium via line 271 can be introduced to the heat exchanger 275 where heat can be transferred from the cycle fluid in line 215 to produce a heated heat transfer medium via line 277 and a cooled cycle fluid via line 215. In another example, during idling of the reactor 201 a warm or hot heat transfer medium via line 271 can be introduced to the heat exchanger 275 where heat can be transferred from the heat transfer medium to the cycle fluid in line 215 to produce a cooled heat transfer medium via line 217 and a heated cycle fluid via line 215. The terms "cool heat transfer medium" and "cold heat transfer medium" refer to a heat transfer medium having a temperature less than the fluidized bed 212 within the reactor 201. The terms "warm heat transfer medium" and "hot heat transfer medium" refer to a heat transfer medium having a temperature greater than the fluidized bed 212 within the reactor 201. The heat exchanger 275 can be used to cool the fluidized bed 212 or heat the fluidized bed 212 depending on the particular operating conditions of the polymerization system 200, e.g. start-up, normal operation, and shut down. Illustrative heat transfer mediums can include, but are not limited to, water, air, glycols, or the like. It is also possible to locate the compressor 270 downstream from the heat exchanger 275 or at an intermediate point between several heat exchangers 275.

After cooling, all or a portion of the cycle fluid in line 215, the cycle fluid can be returned to the reactor 201. The cooled cycle fluid in line 215 can absorb the heat of reaction generated by the polymerization reaction. The heat exchanger 275 can be of any type of heat exchanger. Illustrative heat exchangers can include, but are not limited to, shell and tube, plate and frame, U-tube, and the like. For example, the heat exchanger 275 can be a shell and tube heat exchanger where the cycle fluid via line 215 can be introduced to the tube side and the heat transfer medium can be introduced to the shell side of the heat exchanger 275. If desired, to or more heat exchangers can be employed, in series, parallel, or a combination of series and parallel, to lower or increase the temperature of the cycle fluid in stages.

Preferably, the cycle gas via line 215 is returned to the reactor 201 and to the fluidized bed 212 through the fluid distributor plate ("plate") 219. The plate 219 can prevent polymer particles from settling out and agglomerating into a solid mass. The plate 219 can also prevent or reduce the accumulation of liquid at the bottom of the reactor 201. The plate 219 can also facilitate transitions between processes which contain liquid in the cycle stream 215 and those which do not and vice versa. Although not shown, the cycle gas via line 215 can be introduced into the reactor 201 through a deflector disposed or located intermediate an end of the reactor 201 and the distributor plate 219. Illustrative deflectors and distributor plates suitable for this purpose are described in U.S. Pat. Nos. 4,877,587; 4,933,149; and 6,627,713.

The catalyst feed via line 213 can be introduced to the fluidized bed 212 within the reactor 201 through one or more injection nozzles (not shown) in fluid communication with line 213. The catalyst feed is preferably introduced as pre-formed particles in one or more liquid carriers (i.e. a catalyst slurry). Suitable liquid carriers can include mineral oil and/or liquid or gaseous hydrocarbons including, but not limited to, propane, butane, isopentane, hexane, heptane octane, or mixtures thereof. A gas that is inert to the catalyst slurry such as, for example, nitrogen or argon can also be used to carry the catalyst slurry into the reactor 201. In one example, the catalyst can be a dry powder. In another example, the catalyst can be dissolved in a liquid carrier and introduced to the reactor 201 as a solution. The catalyst via line 213 can be introduced to the reactor 201 at a rate sufficient to maintain polymerization of the monomer(s) therein.

The polymer product via line 217 can be discharged from the reactor 201 by opening valve 257 while valves 259, 267 are in a closed position. Product and fluid enter the product discharge tank 255. Valve 257 is closed and the product is allowed to settle in the product discharge tank 255. Valve 259 is then opened permitting fluid to flow via line 261 from the product discharge tank 255 to the reactor 240. In another example, the separated fluid in line 261 can be introduced to the cycle line 215. The separated fluid in line 261 can include unreacted monomer(s), hydrogen, ICA(s), and/or inerts. Valve 259 can then be closed and valve 267 can be opened and any product in the product discharge tank 255 can flow out of the discharge tank 255. Valve 267 can then be closed. Although not shown, the polymer product via line 268 can be introduced to a plurality of purge bins or separation units, in series, parallel, or a combination of series and parallel, to further separate gases and/or liquids from the product. The particular timing sequence of the valves 257, 259, 267, can be accomplished by use of conventional programmable controllers which are well known in the art.

Another product discharge system which can be alternatively employed is that disclosed in U.S. Pat. No. 4,621,952. Such a system employs at least one (parallel) pair of tanks comprising a settling tank and a transfer tank arranged in series and having the separated gas phase returned from the top of the settling tank to a point in the reactor near the top of the fluidized bed. Other suitable product discharge systems are described in PCT Publications WO2008/045173 and WO2008/045172.

The reactor 201 can be equipped with one or more vent lines 218 to allow venting the bed during start up, operation, and/or shut down. The reactor 201 can be free from the use of stirring and/or wall scraping. The cycle line 215 and the elements therein (compressor 270, heat exchanger 275) can be smooth surfaced and devoid of unnecessary obstructions so as not to impede the flow of cycle fluid or entrained particles.

The conditions for polymerization vary depending upon the monomers, catalysts, catalyst systems, and equipment availability. The specific conditions are known or readily derivable by those skilled in the art. For example, the temperatures can be within the range of from about −10° C. to about 140° C., often about 15° C. to about 120° C., and more often about 70° C. to about 110° C. Pressures can be within the range of from about 10 kPag to about 10,000 kPag, such as about 500 kPag to about 5,000 kPag, or about 1,000 kPag to about 2,200 kPag, for example. Additional details of polymerization can be found in U.S. Pat. No. 6,627,713.

In addition to the particle accumulation probe 103, various other systems and/or methods can be used to monitor and/or control a degree or level of fouling within the reactor 201. For example, if the polymerization system 200 is operated in condensed mode, a common technique for monitoring the polymerization can include monitoring a stickiness control parameter, such as a reduced melt initiation temperature or "dMIT" value, which can provide an estimate as to the degree of polymer stickiness within the reactor 201. Another method for monitoring polymerization can include estimating acoustic emissions within the reactor 201, which can also provide an estimate as to the degree of polymer stickiness within the reactor 201. Additional details of monitoring a stickiness control parameter can be as discussed and described in U.S. Patent Application Publication No. 2008/0065360 and PCT Publication WO2008/030313. Another method for monitoring polymerization can include estimating acoustic emissions within the reactor, which can also provide an estimate as to the degree of polymer stickiness within the reactor. Additional details of monitoring a polymerization reactor via acoustic emissions are described in U.S. Publication No. 2007/0060721.

EXAMPLES

To provide a better understanding of the foregoing discussion, the following non-limiting examples are provided. Although the examples are directed to specific embodiments, they are not to be viewed as limiting the invention in any specific respect.

Figure 4:
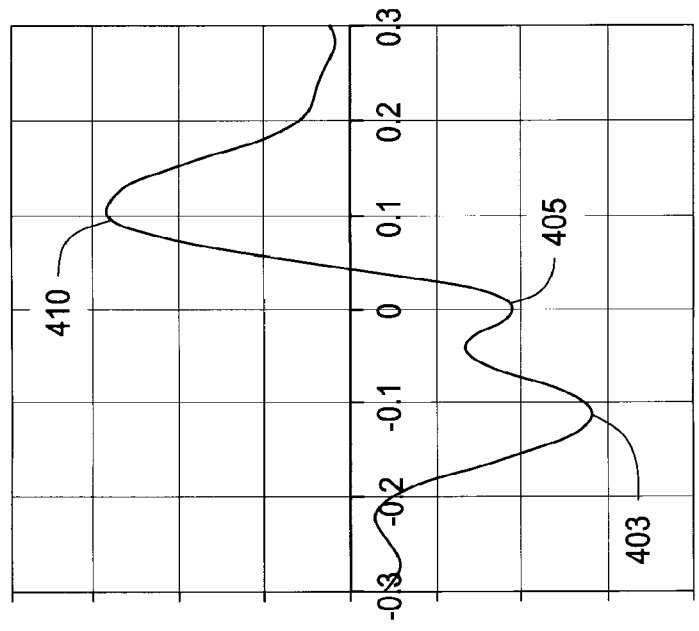
FIG. 4 is a close-up view of the graphical depiction of the absolute autocorrelated entrainment static data shown in FIG. 3 focused on a time lag of 0 (zero) seconds.
Figure 3:
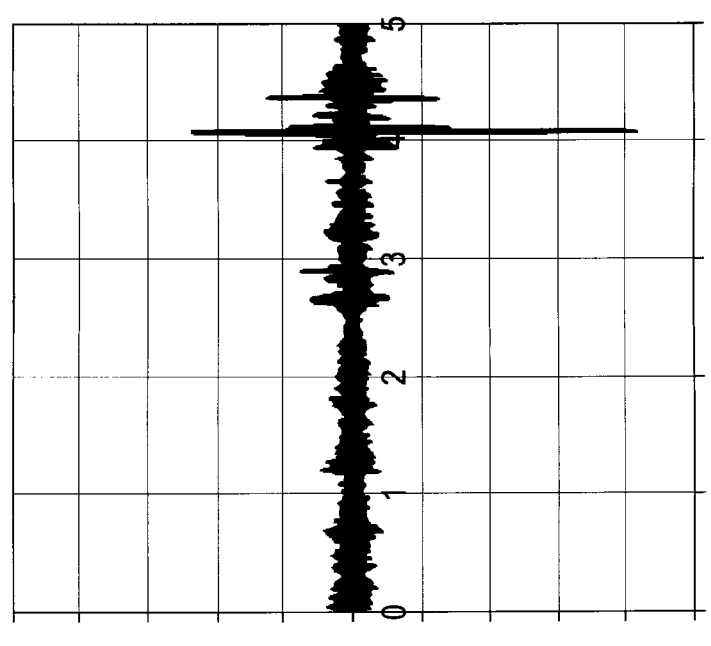
FIG. 3 is a graphical depiction of measured entrainment static detected by a particle accumulation probe during monitoring of a cycle fluid flowing through a gas phase polymerization reactor cycle line during steady state operation.
Figure 7:
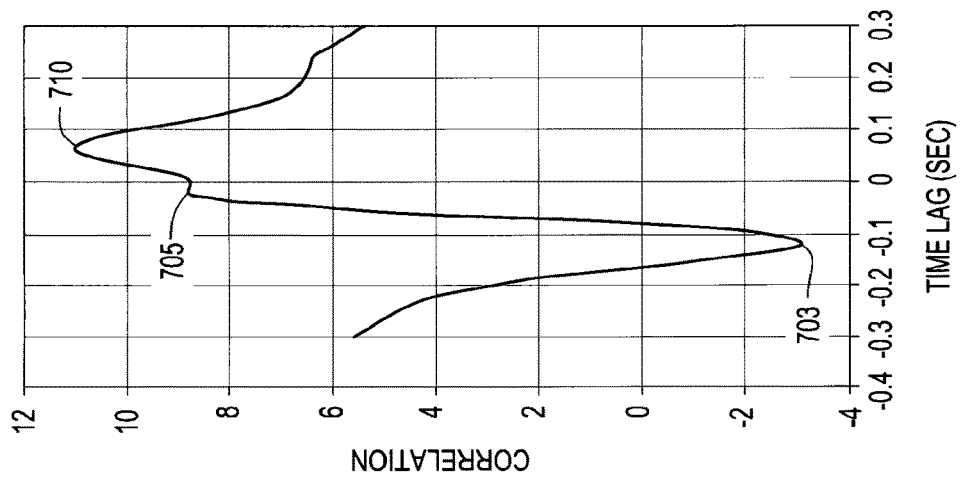
FIG. 7 is a close-up view of the graphical depiction shown in FIG. 6 focused on a time lag of 0 (zero) seconds.
Figure 6:
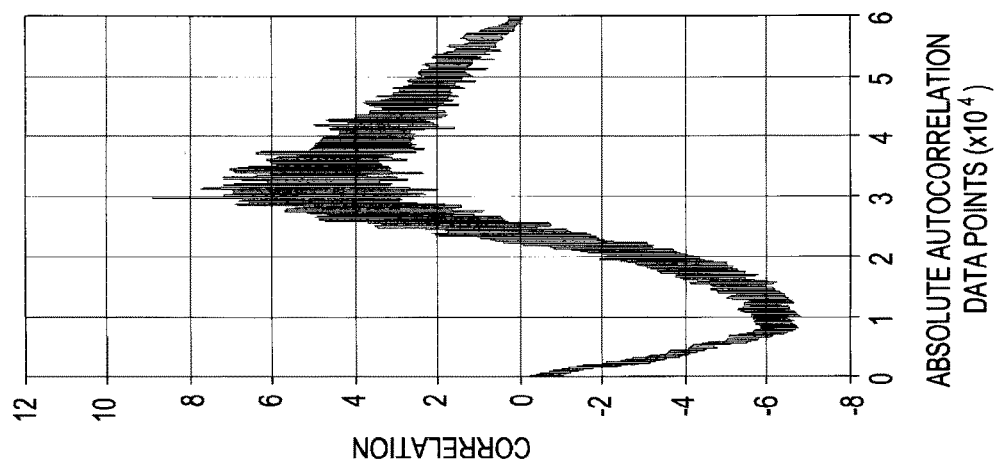
FIG. 6 is a graphical depiction of the absolute autocorrelated entrainment static data shown in FIG. 5.
Figure 5:
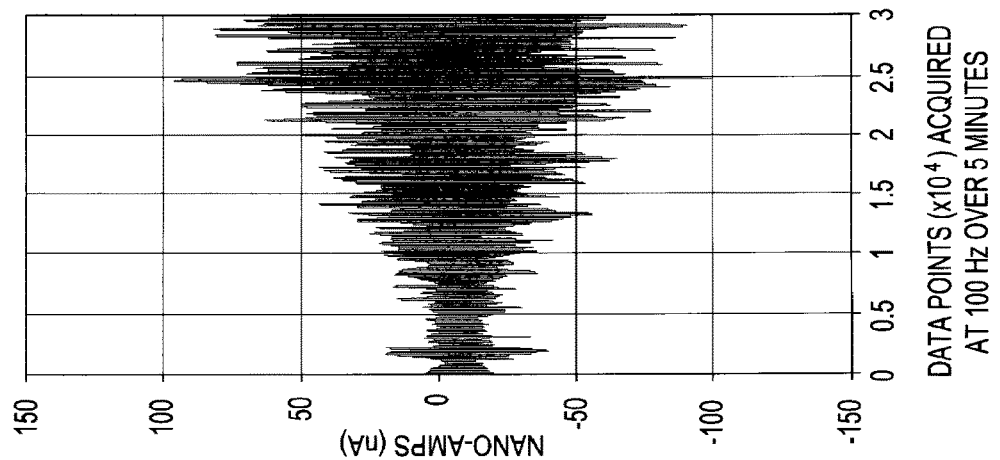
FIG. 5 is a graphical depiction of measured entrainment static detected by a particle accumulation probe during monitoring of a cycle fluid flowing through a gas phase polymerization reactor cycle line during reactor startup.
Figure 10:
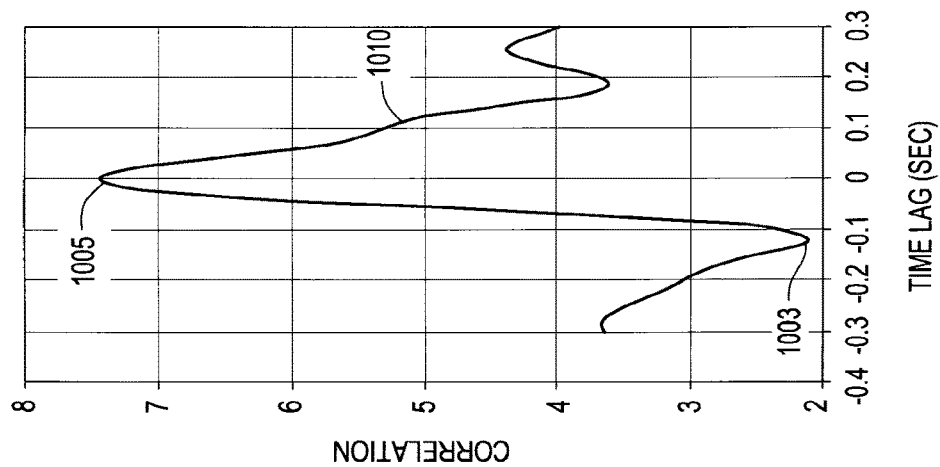
FIG. 10 is a close-up view of the graphical depiction shown in FIG. 9 focused on a time lag of 0 (zero) seconds.
Figure 9:
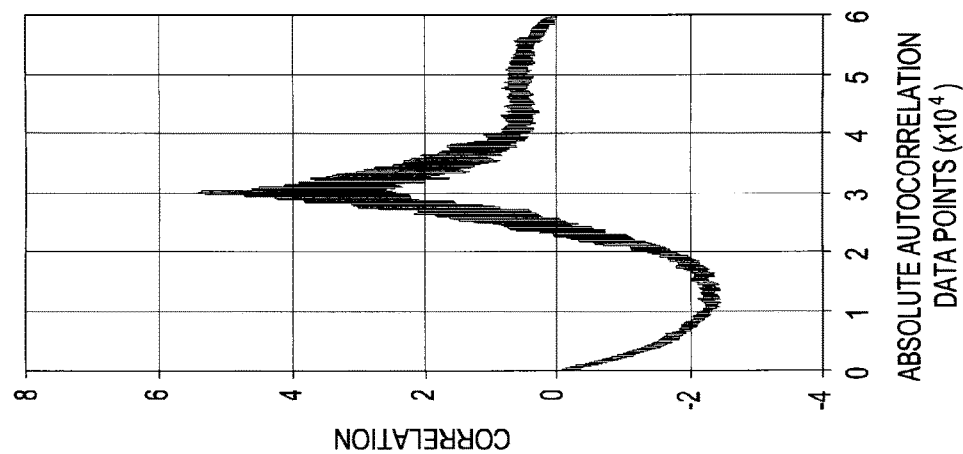
FIG. 9 is a graphical depiction of the absolute autocorrelated entrainment static data shown in FIG. 8.
Figure 8:
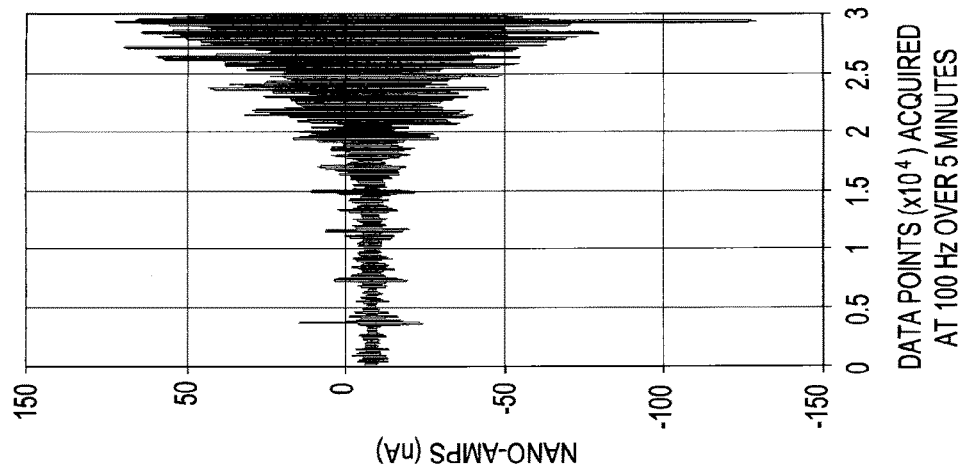
FIG. 8 is another graphical depiction of measured entrainment static detected by a particle accumulation probe during monitoring of a cycle fluid flowing through a gas phase polymerization reactor cycle line during reactor startup.

Data acquired during a gas phase polymerization reactor operating under steady state conditions is shown in FIGS. 3 and 4 (Example 1). Data acquired during a gas phase polymerization reactor startup in which no hyperfouling was observed is shown in FIGS. 5-7 (Example 2). Data acquired during a polymerization reactor startup in which hyperfouling was observed, is shown in FIGS. 8-10 (Example 3).

The particle accumulation probe used for measuring the current ("entrainment static") in all examples was a Progression Correflux model 3400 with custom "fast," "bipolar" electronics capable of 5 millisecond response. The model 3400 probe was mounted in a gas phase reactor system of the type described in FIG. 2, where the probe was mounted on the reactor cycle gas system, approximately 5 meters downstream of the compressor. The probe extended about 18 inches into a 36 inch diameter cycle pipe (to the centerline of the pipe). An integral housing located outside the flange contained the electrometer and a high-speed transmitter. The electronics were shielded to eliminate outside stray electromagnetic fields from interfering with the probe.

The particle accumulation probe sampled the entrainment static data at 100 Hz for a period of 5 minutes for all examples. As such, the number of data points acquired over the 5 minutes was equal to 30,000 data points. The measured electric current for all examples was acquired during polymerization start-up for a gas phase polymerization system.

The measured entrainment static data for all examples was introduced to a processor configured to operate the software program Matlab (available from The MathWorks). The Matlab function "xcorr" was used to manipulate the measured entrainment static using the absolute autocorrelation methodology for entrainment static data measured via the electrometer.

Referring to Example 1, FIG. 3 is a graphical depiction of the measured entrainment static detected by a particle accumulation probe during monitoring of a cycle fluid flowing through a gas phase polymerization reactor cycle line during steady state operation. FIG. 4 is a close-up view of the graphical depiction of the absolute autocorrelated entrainment static data shown in FIG. 3 focused on a time lag of 0 (zero) seconds. The data shown in FIGS. 3 and 4 is representative of data acquired during numerous, typical gas phase polymerization reactors while operating under steady state conditions. In other words, Example 1 is provided to illustrate typical data acquired from gas phase polymerization reactors operating under a range various process conditions and parameters, e.g., varying reactor temperatures, pressures, feed rates, reactants, and the like.

As shown in FIG. 4, the leading lobe 403 was located at about −0.11 seconds and was a "negative" or minimum type peak. The lagging lobe 410 was essentially a mirror image of the leading lobe 403 and occurred at about +0.11 seconds and was a "positive" or maximum type peak. The peak at zero time lag 405 was also a "negative" or minimum type peak as the leading lobe 403. Since the leading lobe 403 and the peak at zero time lag 405 are both minima, it can be inferred that the average particle striking the probe was of the same charge sign as the average particle approaching the probe. Accordingly, Example 1 shows a typical gas phase polymerization reactor operating under normal, non-fouling conditions, steady state conditions in which catalyst particles were not found to be segregating out of the particle/fluid mixture flowing through the cycle line.

Referring to Example 2, FIG. 5 is a graphical depiction of measured entrainment static detected by the particle accumulation probe during monitoring of a cycle fluid flowing through a gas phase polymerization reactor cycle line. The time at which the catalyst was introduced to the polymerization reactor was around $0.5 \times 10^4$ data points on the x-axis or about 50 seconds after measurement of the electric current began.

The polymer product in Example 2 was prepared by polymerizing ethylene and hexene in a gas phase polymerization reactor. The polymer product was produced using a metallocene catalyst. The gas composition within the reactor was about 57.1 mol % ethylene, about 0.95 mol % hexene, about 0.02 mol % hydrogen, about 35.1 mol % nitrogen, and about 7.0 mol % isopentane (used as and Induced Condensing Agent, ICA). The ethylene partial pressure was about 151.8 psia. The reactor was operated at a temperature of about 181° F. and a pressure of about 263 psig. Since the data was acquired during reactor start-up, none of the isopentane was condensed. The superficial gas velocity of the cycle gas through the polymerization reactor was about 2.3 ft/s. After introduction of the catalyst (approximately the $0.5 \times 10^4$ data point) a general increase or widening of static detected by the particle accumulation probe was observed and is clearly shown as a widening of the measured static shown in FIG. 5.

FIG. 6 is a graphical depiction of the absolute autocorrelated entrainment static data shown in FIG. 5. The absolute autocorrelated data graphically depicted in FIG. 6 shows that an average charge of the charged particles in the cycle fluid was negatively charged. From experimental observation and experience, negative charges in a particle/fluid mixture of a gas phase polymerization process using a metallocene catalyst is generated from polymer particles. In other words, the polymer particles in a gas phase polymerization cycle fluid are negatively charged. As such, the dominant charge measured via the electrometer was generated by negatively charged polymer particles.

FIG. 7 is a close-up view of the graphical depiction shown in FIG. 6 focused on a time lag of 0 (zero) seconds. At zero time lag there was a weak signal 705, which indicates that relatively few charged particles struck the probe. The zero-lag signal 705 is small and was within the band of y-axis values defined by the minima and maxima of the leading lobe 703 and lagging lobe 710, respectively. The zero-lag signal 705 appears as more of a plateau than a distinct peak, that possibly indicates very little material was striking the probe (regardless of charge). Accordingly the measured entrainment static data shown in FIG. 7 indicates that the positively charged catalyst particles were not segregating out of the cycle fluid and accumulating onto the inner surfaces of the polymerization system. Hyperfouling of the reactor was not observed during this polymerization reactor startup of Example 2.

Referring to Example 3, FIG. 8 is a graphical depiction of measured entrainment static detected by a particle accumulation probe during monitoring of a cycled fluid flowing through a gas phase polymerization reactor cycle line. The time at which the catalyst was introduced to the polymerization reactor was around $1.6 \times 10^4$ data points on the x-axis or about 2 minutes and 40 seconds after measurement of the electric current began.

The polymer product in Example 3 was also prepared by polymerizing ethylene and hexene in a gas phase polymerization reactor 101. The polymer product was produced using a metallocene catalyst. The conditions of polymerization were similar to those used in Example 2. After introduction of the catalyst (approximately the $1.6 \times 10^4$ data point) a general increase or widening of static detected by the particle accumulation probe was observed and is clearly shown as a widening of the measured static shown in FIG. 8.

FIG. 9 is a graphical depiction of the absolute autocorrelated entrainment static data shown in FIG. 8. The absolute autocorrelation data graphically depicted in FIG. 9 shows that an average charge of the charged particles in the cycle fluid was also negatively charged. However, the average particle contacting the particle accumulation probe was positively charged catalyst particles. FIG. 10 is a close-up view of the graphical depiction shown in FIG. 9 focused on a time lag of 0 (zero) seconds. At a time lag of 0 (zero) seconds there was a strong signal peak 1005, which indicates that a large number of charged particles struck the probe, and the particles that did strike the probe were, on average, positively charged catalyst particles. The "passing particles" create a leading lobe 1003 and a lagging lobe 1010 (y-axis values of about 2.1 and about 5.3, respectively, consistent with typical negatively charged polymer particles. For the purposes of the present example, a "significant segregation of charged material" onto the probe (in this case, positively charged catalyst segregating from a majority-negative polymer particles) can refer to a absolute autocorrelation zero-lag peak which lies outside the band or range defined by the leading lobe and the lagging lobe and of the same type (as a maximum or minimum) as the lagging lobe. Accordingly the measured entrainment static data shown in FIG. 10 indicates that the positively charged catalyst particles were segregating out of the cycle fluid and accumulating onto the inner surfaces of the polymerization system. Hyperfouling of the reactor was observed during this polymerization reactor startup.

The entrainment static detected during the normal, steady state gas phase polymerization Example 1 provided a clear indication that the observed entrainment static was accompanied by negatively charged polymer particles predominantly contacting the particle accumulation probe and, as such, neither catalyst particle accumulation nor hyperfouling were observed. The entrainment static detected during the polymerization reactor startup of Example 2 provided an indication that the observed entrainment static was accompanied by relatively few (if any) particles striking the probe or perhaps some positively charged catalyst particles were striking the probe, but not a sufficient amount to cause hyperfouling. In other words, the zero-lag signal (plateau) 705 indicated that the amount of positively charged catalyst particles, on average, striking the particle accumulation probe in Example 2 were not sufficient to cause hyperfouling within the polymerization system. This conclusion is based on the fact that the zero-lag signal (plateau) 705 did not exceed the band or range of the leading and lagging lobes 703, 710. For example, the lagging lobe 710 had a peak value of about 11 while the zero-lag signal (plateau) 705 only had a value of about 9, which did not exceed the band or range of the lagging lobe 710.

In contrast, the entrainment static detected during the polymerization reactor start-up of Example 3 provided a clear indication that the observed entrainment static was accompanied by positively charged particles predominantly contacting the particle accumulation probe and, as such, hyperfouling was observed. The zero-lag signal (peak) 1005 had a absolute autocorrelation value of about 7.5 and significantly exceeded the absolute autocorrelation value of the lagging lobe 1010, which was about 5.3. Accordingly, a surprising and unexpected method for monitoring the entrainment static during operation of a gas phase polymerization system, e.g., steady state operation, start-up, transition periods, and the like, based on the measured entrainment static using a particle accumulation probe has been discovered. Furthermore, a reliable method for determining when entrainment static is accompanied by predominantly positively charged catalyst particles striking the particle accumulation probe has been developed for use in monitoring a polymerization reactor system. Absolute autocorrelating the entrainment static can provide a visually understandable and useful indicator as to whether or not catalyst particles are, or are likely to be, accumulating onto the inner surfaces of the polymerization system.

All numerical values are "about" or "approximately" the indicated value, and take into account experimental error and variations that would be expected by a person having ordinary skill in the art. All parts, proportions and percentages are by weight unless otherwise indicated.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for monitoring a particle/fluid mixture, comprising:
    flowing a mixture comprising charged particles and a fluid past a particle accumulation probe;
    measuring electrical signals detected by the probe as some charged particles pass the probe without contacting the probe while other charged particles contact the probe;
    manipulating the measured electrical signal to provide an output wherein manipulating the measured electrical signal includes using an absolute autocorrelation method that correlates mean centered data using an approaching curve indicating a charge on particles that approach the probe, a leaving curve indicating a charge on particles that pass and move away from the probe, and a zero-lag peak that indicates the charge on the particles that contact the probe to provide the output; and
    determining from the output if the charged particles contacting the probe have, on average, a different charge than the charged particles that pass the probe without contacting the probe.

2. The method of claim 1, wherein the charged particles comprise catalyst particles and polymer particles, and wherein the fluid comprises one or more hydrocarbons.

3. The method of claim 1, wherein the charged particles comprise primarily polymer particles having, on average, a negative charge and a minority of catalyst particles having, on average, a positive charge, wherein the output indicates the charged particles contacting the probe are, on average, negatively charged polymer particles, and wherein the output indicates that catalyst particles are not segregating out of the mixture in an amount sufficient to cause the formation of agglomerations.

4. The method of claim 1, wherein the charged particles comprise primarily polymer particles having, on average, a negative charge and a minority of catalyst particles having, on average, a positive charge, wherein the output indicates the charged particles contacting the probe are, on average, positively charged catalyst particles, and wherein the output indicates that the catalyst particles are segregating out of the mixture in an amount sufficient to cause the formation of agglomerations.

5. The method of claim 1, wherein the charged particles comprise primarily polymer particles having, on average, a positive charge and a minority of catalyst particles having, on average, a negative charge, wherein the output indicates the charged particles contacting the probe are, on average, positively charged polymer particles, and wherein the output indicates that catalyst particles are not segregating out of the mixture in an amount sufficient to cause the formation of agglomerations.

6. The method of claim 1, wherein the charged particles comprise primarily polymer particles having, on average, a positive charge and a minority of catalyst particles having, on average, a negative charge, wherein the output indicates the charged particles contacting the probe are, on average, negatively charged catalyst particles, and wherein the output indicates that the catalyst particles are segregating out of the mixture in an amount sufficient to cause the formation of agglomerations.

7. The method of claim 1, wherein the charged particles comprise catalyst particles, and said catalyst particles comprise one or more metallocene catalysts.

8. The method of claim 1, wherein the flowing mixture is located within a polymerization system.

9. The method of claim 1, wherein the flowing mixture is located within a cycle line of a gas phase polymerization reactor.

10. The method of claim 1, wherein the particle accumulation probe is in communication with an internal volume of a polymerization reactor or a cycle line of the polymerization reactor.

11. The method of claim 1, further comprising altering one or more process parameters if the charged particles contacting the probe have, on average, a positive charge.

12. The method of claim 1, further comprising introducing one or more continuity additives to the mixture if the charged particles contacting the probe have, on average, a negative charge.

13. The method of claim 1, wherein manipulating the measured electrical signal is carried out using a processor.

14. The method of claim 1, wherein the electrical signal is measured at a sampling frequency of about 100 Hz or more.

* * * * *